(12) United States Patent
Kondameedi et al.

(10) Patent No.: US 10,835,990 B2
(45) Date of Patent: Nov. 17, 2020

(54) CUTTING TOOLS COMPRISING ULTRAHARD MATERIALS AND METHODS OF MAKING THE SAME

(71) Applicant: Kennametal Inc., Latrobe, PA (US)

(72) Inventors: Naveen Kumar Kondameedi, Murrysville, PA (US); Christoph Gey, Stetten (CH); Joseph Velesig, West Lebanon, PA (US); Gerald Natter, Swanton, OH (US)

(73) Assignee: KENNAMETAL INC., Latrobe, PA (US)

( * ) Notice: Subject to any disclaimer, the term of this patent is extended or adjusted under 35 U.S.C. 154(b) by 367 days.

(21) Appl. No.: 15/881,214

(22) Filed: Jan. 26, 2018

(65) Prior Publication Data

US 2019/0232420 A1 Aug. 1, 2019

(51) Int. Cl.
| | |
|---|---|
| *B23K 26/00* | (2014.01) |
| *B23K 26/0622* | (2014.01) |
| *B23K 101/20* | (2006.01) |
| *B23K 103/00* | (2006.01) |

(52) U.S. Cl.
CPC ...... *B23K 26/0006* (2013.01); *B23K 26/0624* (2015.10); *B23K 2101/20* (2018.08); *B23K 2103/50* (2018.08)

(58) Field of Classification Search
CPC ............ B23K 26/0006; B23K 26/0624; B23K 2101/20; B23K 2103/50
USPC ..................................................... 219/121.67
See application file for complete search history.

(56) References Cited

U.S. PATENT DOCUMENTS

| | | | | |
|---|---|---|---|---|
| 2011/0220625 | A1* | 9/2011 | Pluss .................. | B23K 26/0823 219/121.72 |
| 2014/0239051 | A1* | 8/2014 | Barry .................... | B23B 27/143 228/121 |
| 2015/0258632 | A1* | 9/2015 | Pluess ................ | B23K 26/0823 219/121.72 |
| 2019/0351504 | A1* | 11/2019 | Reisacher ............ | B23K 26/032 |
| 2020/0030889 | A1* | 1/2020 | Harada .................. | B23K 26/00 |

* cited by examiner

*Primary Examiner* — Huyen D Le
(74) *Attorney, Agent, or Firm* — Larry R. Meenan (57) ABSTRACT

In one aspect, methods of fabricating cutting tools employing ultrahard materials are described herein. A method of making a cutting tool comprises electronically loading a cutting tool pattern into a laser machining system and providing a blank to the laser machining system, the blank comprising a layer of ultrahard material. The cutting tool pattern is administered to the blank via a single laser processing step to form the cutting tool including at least one as-formed cutting edge comprising the ultrahard material and having an edge radius less than 10 μm. The single laser processing step can provide the cutting tool in final form, thereby obviating further processing steps.

26 Claims, 5 Drawing Sheets

FIG.5

CUTTING TOOLS COMPRISING ULTRAHARD MATERIALS AND METHODS OF MAKING THE SAME

FIELD

The present invention relates to cutting tools comprising ultrahard materials and, in particular, to efficient methods of producing such cutting tools.

BACKGROUND

Ultrahard materials, such and diamond and cubic boron nitride, are useful in tooling applications, including machining of various materials. High hardness and high wear resistance offered by ultrahard materials can dramatically extend cutting tool lifetimes. Polycrystalline cubic boron nitride (PCBN), for example, is about 100 times more wear resistant than cemented tungsten carbide, and polycrystalline diamond (PCD) is about 10 times more wear resistant than PCBN.

While beneficial for tooling applications, materials of high hardness and high wear resistance can present several challenges in tool fabrication. Synthesis of diamond grit or cubic boron nitride can be achieved by high-pressure, high temperature (HPHT) techniques. Diamond may also be deposited via chemical vapor deposition (CVD). Polycrystalline materials, including PCD and PCBN, can be produced by sintering individual crystals into a larger, continuous body. Notably, the sintering technique must maintain the crystals in the cubic region of the phase diagram to prevent conversion to softer hexagonal phases. Accordingly, high temperatures and high pressures are required. PCD and PCBN are commonly formed into blanks from which cutting tools are fabricated.

Generally, PCD or PCBN blanks are cut into smaller pieces by wire electrodischarge machining (EDM). An individual piece cut from the mother blank is subsequently brazed into a pocket of a steel or cemented carbide substrate. Alternatively, a table of PCD or PCBN can be bonded to a cemented carbide substrate. Cutting edge preparation is the next step in the fabrication process. Grinding and/or radiusing can provide the desired cutting edge geometry and edge quality, while removing surface damage and defects imparted by the wire EDM process. Grinding ultrahard materials is difficult and time consuming. In cases of complex cutting edge geometries, electrical discharge grinding can be employed. Cutting edge preparation of ultrahard materials is particularly cumbersome when the cutting tool is indexable or comprises cutting edges of substantial length.

SUMMARY

In view of these disadvantages, methods of fabricating cutting tools comprising ultrahard materials are described herein which, in some embodiments, can provide cost and/or time efficiencies. Such methods, for example, can provide a finished cutting tool in a single processing step, thereby saving time and cost associated with multi-step processes wherein a blank of ultrahard material is cut, brazed to a substrate and subsequently subjected to labor intensive cutting edge preparation techniques. Briefly, a method of making a cutting tool comprises electronically loading a cutting tool pattern into a laser machining system and providing a blank to the laser machining system, the blank comprising a layer of ultrahard material. The cutting tool pattern is administered to the blank via a single laser processing step to form the cutting tool including at least one as-formed cutting edge comprising the ultrahard material and having an edge radius less than 10 µm. Moreover, the ultrahard material of a flank face of the as-formed cutting edge can have surface roughness ($R_a$) of less than 0.4 µm.

In another aspect, cutting inserts comprising ultrahard materials are described herein. A cutting insert, for example, comprises a layer of ultrahard material defining a rake face and flank face of at least one cutting edge, the cutting edge having a radius less than 10 µm, wherein surface roughness ($R_a$) of the ultrahard material along the flank face is less than 0.4 µm.

These and other embodiments are further described in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Methods of Fabricating Cutting Tools

In one aspect, methods of fabricating cutting tools employing ultrahard materials are described herein. A method of making a cutting tool comprises electronically loading a cutting tool pattern into a laser machining system and providing a blank to the laser machining system, the blank comprising a layer of ultrahard material. The cutting tool pattern is administered to the blank via a single laser processing step to form the cutting tool including at least one as-formed cutting edge comprising the ultrahard material and having an edge radius less than 10 µm. Moreover, the ultrahard material of a flank face of the as-formed cutting edge can have surface roughness ($R_a$) of less than 0.4 µm.

Turning now to specific steps, an electronic version of a cutting tool pattern is loaded on a laser machining system. The laser machining system guides the cutting laser in accordance with the pattern to produce the cutting tool from the blank in a single step. The cutting tool pattern, therefore, includes geometrical and structure features of the finished cutting tool. In some embodiments, for example, the cutting tool pattern is for an indexable cutting insert. For turning inserts, the electronic pattern includes data corresponding to insert shape, clearance angle(s), tolerance, groove/chip breaker, size (inscribed circle), thickness and radius. Electronic patterns for milling inserts can comprise the same information as turning inserts with the addition of wiper lead angle, wiper clearance angle, cutting edge preparation and cutting direction. A cutting tool pattern can have parameters corresponding to any American National Standards Institute (ANSI) or International Organization for Standardization (ISO) cutting insert nomenclature or designation. For example, shape of the cutting insert produced by the electronic pattern can be selected from Code Letters A, B, C, D, E, H, K, L, M, N, O, P, R, S, T, V, W and X of ANSI nomenclature.

Alternatively, an electronic cutting insert pattern can have any number of design, geometrical and/or structural properties outside of ANSI or ISO nomenclature. Laser cutting the insert from a blank described herein permits freedom of any design. The cutting insert pattern can have any perimeter geometry including polygonal, circular, elliptical or combinations thereof. When polygonal, the pattern can have any number of sides. The insert pattern can also comprise one or more curve-linear geometries. In some embodiments, a pattern of a cutting insert comprises a primary flank clearance and secondary flank clearance. Primary and secondary flank clearances can be set to any desired angles. A primary flank clearance, for example, can range for 5-12 degrees. Additionally, a secondary flank clearance can generally be set at a larger angle than the primary clearance. In some embodiments, a secondary flank clearance can range from 13-17 degrees. Other angular ranges for primary and secondary flank clearances are possible. In some embodiments, the primary and secondary flank clearances intersect one another.

An electronic pattern for the cutting tool, including cutting inserts, can comprise a roughing sub-pattern, in some embodiments. Administration of the roughing pattern to the blank can result in the desired edge radius and flank surface roughness values described further herein. In some embodiments, the cutting tool pattern also comprises a finishing sub-pattern in addition to the roughing sub-pattern. Depending on particular cutting tool design and requirements, the finishing sub-pattern can follow the entire roughing sub-pattern. In other embodiments, the finishing sub-pattern follows only a portion of the roughing sub-pattern. In such embodiments, the finishing sub-pattern is administered to only a portion of the cutting tool. For example, the finishing sub-pattern can be administered to the cutting edge and primary clearance without being administered to the secondary clearance. The finishing sub-pattern can have any desired offset from the roughing sub-pattern. Offset generally refers to the spatial difference between the roughing sub-pattern and finishing sub-pattern at any location of the cutting tool. In some embodiments, offset is uniform or substantially uniform over the cutting tool. In other embodiments, offset can vary according to specific location on the cutting tool. Offset along the cutting edge, for example, may vary from offset along the flank face. Generally, offset between the roughing and finishing sub-patterns can range from 10-50 µm. Additional offset values can be selected from Table I.

TABLE I

| Roughing and Finishing Sub-Pattern Offset (µm) |
| --- |
| 10-30 |
| 15-25 |
| 20-40 |
| 20-30 |

Figure 1:
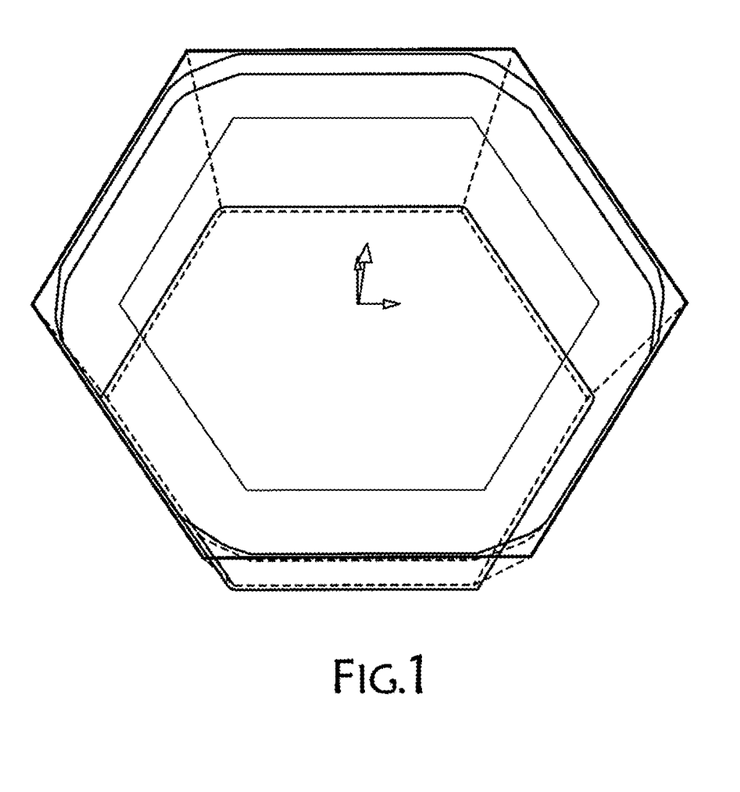
FIG. 1 illustrates a graphical representation of an electronic cutting insert pattern according to some embodiments.

FIG. 1 illustrates a representation of an electronic cutting insert pattern according to some embodiments. As illustrated in FIG. 1, the cutting insert is to be cut from a hexagonal blank.

The blank provided to the laser machining system can have various constructions. In some embodiments, for example, the blank is formed of a layer of ultrahard material, such as PCD or PCBN. Sintering individual crystals of diamond or cubic boron nitride at high temperature and high pressure can yield the layer of PCD or PCBN. Sintering is generally enhanced by the addition of metal, such as cobalt, or a ceramic second phase. Metallic binder can generally be present in PCD compositions in an amount of 5-10 vol. %.

In some embodiments, the layer of PCD or PCBN is not associated with any substrate and presents a freestanding, monolithic blank out of which the cutting tool can be processed. A monolithic layer of PCD or PCBN, for example, can be in disc format. The disc can be polygonal, circular or elliptical and can have any desired thickness. In some embodiments, a PCD or PCBN disc has thickness of 1-15 mm. Alternatively, the blank comprises a layer of PCD or PCBN coupled to a substrate in a layered format. In some embodiments, a layer of PCD or PCBN is bonded to a cemented carbide substrate or ceramic substrate. The layer of PCD or PCBN over the substrate can generally have thickness of 0.3 mm to 1.5 mm. In some embodiments, the layer of PCD or PCBN has a thickness selected from Table II.

TABLE II

| PCD or PCBN Layer Thickness (mm) |
| --- |
| 0.4-2 |
| 0.5-3 |
| 0.6-3 |
| 0.7-2 |
| >1.5 |
| 0.05-0.3 |

Moreover, the PCD layer can have various diamond particle sizes. In some embodiments, diamond particles of the PCD layer have an average size of 0.5-4 µm. In other embodiments, average diamond particle size is 5-24 µm. In a further embodiment, the diamond particles can be coarse, having an average size greater than or equal to 25 µm. Diamond particles may also have an average size selected from Table III.

TABLE III

| Average Diamond Particle Size (µm) |
| --- |
| 1-5 |
| 7-20 |
| 8-15 |
| 25-40 |
| 10-20 |

In addition to PCD and PCBN, a layer of ultrahard material may be formed of diamond deposited by chemical vapor deposition (CVD). A CVD diamond layer, for example, can be grown on a substrate, such as cemented carbide or ceramic, to provide a blank for laser machining into the cutting tool. The CVD diamond layer can have any desired thickness, including thickness values provided in Table II herein.

Cemented carbide substrates to which the layer of ultrahard material is bonded can have any composition and thickness not inconsistent with the objectives of the present invention. In some embodiments, for example, the cemented carbide substrate can have thickness of 0.5 mm to 25 mm.

For methods described herein, the blank may be in a virgin state or condition. In being in a virgin state or condition, the blank has not been previously cut, such as sectioning into smaller pieces via EDM or other cutting technique. In other embodiments, the blank may have been cut or sectioned from a mother blank. In such embodiments, the blank can be of sufficient size that the cutting tool can be completely processed within the perimeter of the blank. Accordingly, surfaces of the blank machined during sectioning from the mother blank are not processed in the laser machining, and the cutting tool is completely fabricated from interior regions of the blank.

The blank can be secured to a stage of the laser machining system. The stage can be static or moveable relative to the laser beam employed to administer the cutting tool pattern. The cutting tool pattern is administered to the blank via a single laser processing step to form the cutting tool. Specific laser beam parameters can be dependent on the particular compositional identity of the blank. In some embodiments, nanosecond pulsed lasers are employed. In other embodiments, ultrashort pulsed lasers (e.g. picosecond or femtosecond) are used having the capacity to transfer energy into the ultrahard material in extremely limited time durations, generally less than the thermal excitation time of lattice-electron interactions. Further, peak intensity can reach or exceed $GW/cm^2$ enabling ablation of ultrahard material grains and associated metallic or ceramic binder. General laser beam specifications for methods described herein are provided in Table IV.

TABLE IV

Laser Beam Specifications

| | |
|---|---|
| Wavelength(s) | UV-near IR |
| Medial Power | 5-50 W |
| Pulse Width | 50-250 ns |
| Focal Diameter | <100 μm |

Focal diameter can also be 20-70 μm. In some embodiments, the laser beam can be confined by a medium supporting total internal reflection of the laser beam. For example, the laser beam can be confined in a jet or stream of water. Machining systems wherein the laser beam is confined to a jet or stream of water are commercially available from Synova S.A. of Duillier (Nyon), Switzerland. In other embodiments, the laser beam can be rotated during the cutting process. Laser trepanning apparatus for example, can be employed in the cutting operation. Such systems can be designed and implemented to enable the adjustment of circular beam displacement and integration during rotation of the optics. Optic rotation speed for the present cutting applications can exceed 10,000 rpm for smaller pulse overlap. Further, the laser beam can exhibit a rotationally symmetric weight distribution.

In some embodiments, the cutting tool pattern is administered by the laser beam within the perimeter of the blank.

Figure 2:
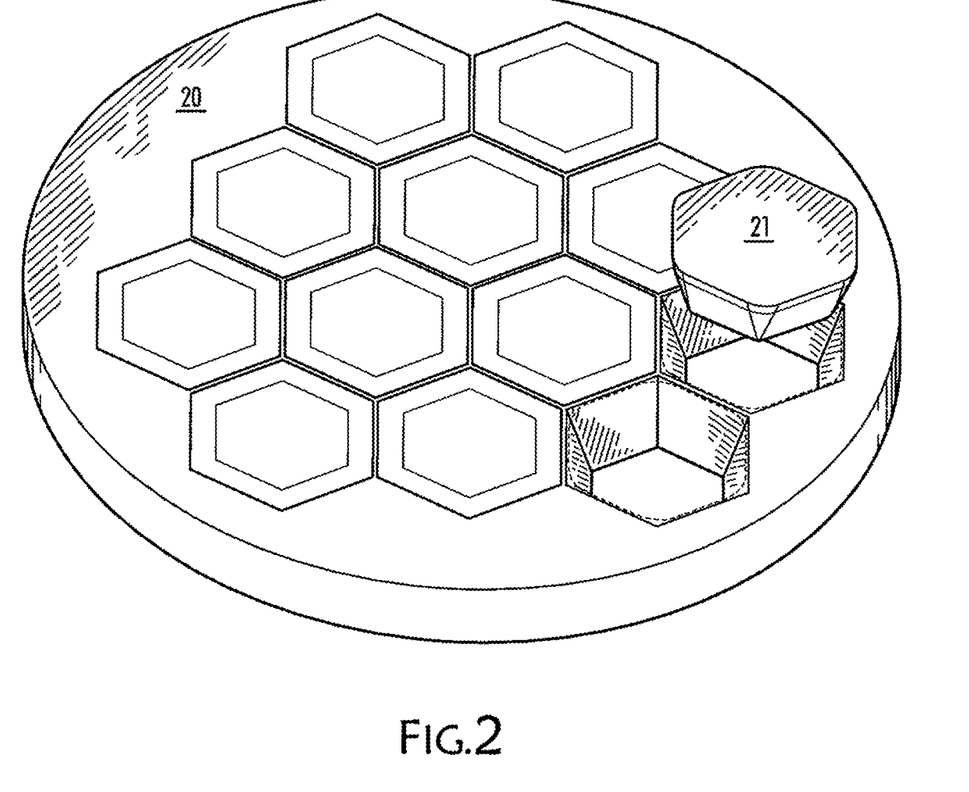
FIG. 2 is a perspective view of cutting tools processed within the perimeter of the blank according to a single-step method described herein.
Figure 3:
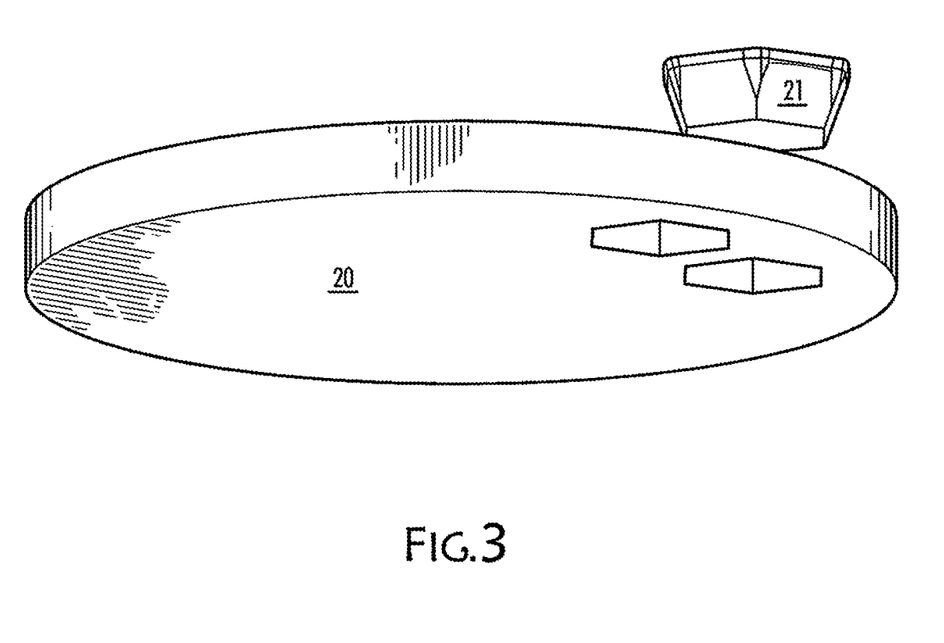
FIG. 3 is a perspective view of cutting tools processed within the perimeter of the blank according to a single-step method described herein.

In such embodiments, the cutting tool can be completely processed within the perimeter of the blank. Accordingly, side surfaces of the blank are not cut or processed and do not form part of the cutting tool produced according to the pattern. FIG. 2 illustrates cutting tools processed within the perimeter of the blank according to a method described herein. As illustrated in FIG. 2, the perimeter of the blank 20 remains intact and the cutting inserts 21 are independently cut in a single step process from the interior of the blank 20. Depending on size of the blank and desired size of the cutting inserts, one or a plurality of inserts may be independently cut from the blank's interior. In the embodiment of FIG. 2, several inserts 21 are cut from the interior of the blank 20. FIG. 3 is a perspective view of the bottom of the blank illustrated in FIG. 2. As illustrated in FIG. 3, the laser beam cuts through the entire thickness of the blank 20, and the cutting inserts 21 are removed from the interior of the blank 20. Notably, material of the blank remains between inserts adjacently cut from the blank. Accordingly, single-step processing of one insert from the blank does not form side(s) of adjacent insert(s) to be cut from the blank. However, depending on insert geometry, processing of one insert may form side(s) of adjacent insert(s). In this way processing efficiencies may be realized.

The cutting edge formed by administration of the cutting tool pattern via the laser machining system has an edge radius less than 10 μm. Notably, the cutting edge exhibits an edge radius less than 10 μm in the as-formed condition. In being in the as-formed condition, the cutting edge has not been subjected to further processing after the laser machining system has completed administration of the cutting tool pattern. This is a substantial departure from prior laser machining techniques where a cutting tool is rough cut within a wide tolerance, and cutting edge geometry and radius are subsequently prepared in one or more downstream processing steps with laser irradiation at various inclination angles to the cutting tool. In prior methods, rough cutting the blank and removing scrap material provides clear views of rake and flank faces of the cutting tool. This enables significant freedom of movement of the laser beam at various inclination angles to prepare desired cutting edge geometry and edge radius. Subsequent preparation of cutting edge geometry and edge radius also permits employment of lasers of various wavelength, energy density and pulse duration tailored to provide the desired finished condition of the cutting tool.

This is not the case for methods described herein where the cutting edge geometry and edge radius are formed in a single laser processing step according to the cutting tool pattern. In some embodiments, the cutting tool has an as-formed edge radius selected from Table V.

TABLE V

| Radius of As-Formed Cutting Edge (μm) |
|---|
| ≤5 |
| 1-7 |
| 0.5-5 |
| 0.5-3 |
| 1-2 |

In some embodiments, each of the as-formed cutting edges of the cutting tool can have an edge radius value described herein. For example, each cutting edge of an indexable insert can have an edge radius selected from Table V.

Figure 4:
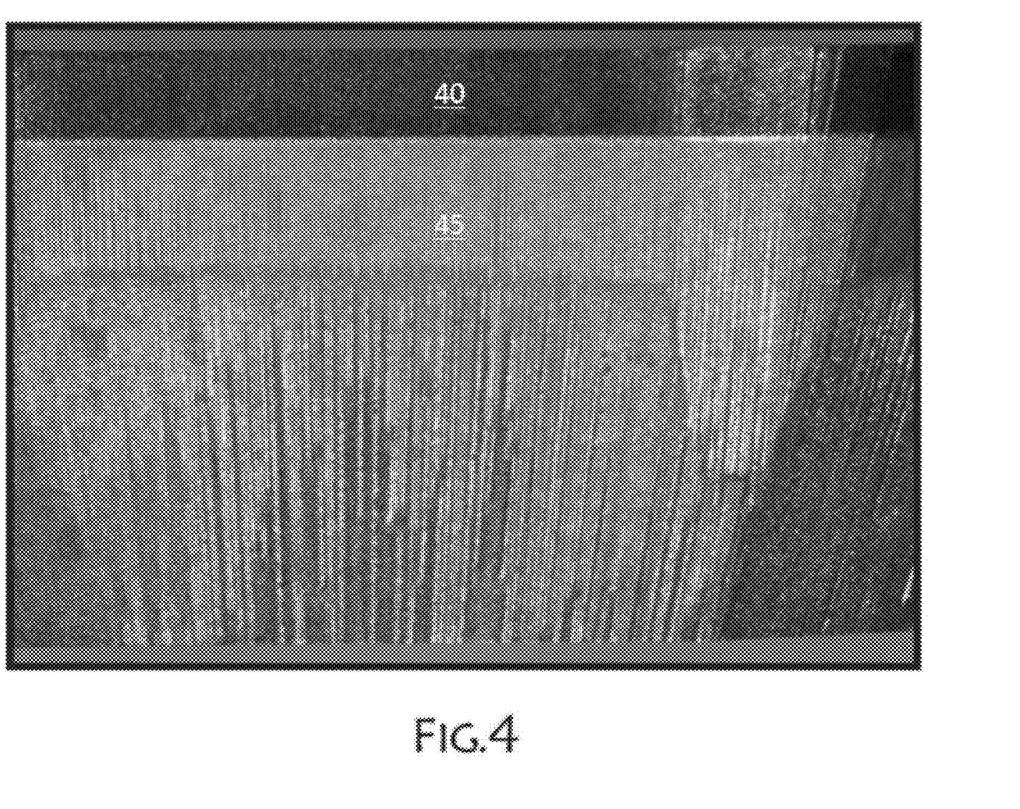
FIG. 4 is a side view of a cutting insert formed via laser administration of a cutting tool pattern to a blank, the blank comprising a layer of PCD coupled to a cemented carbide substrate according to some embodiments.
Figure 5:
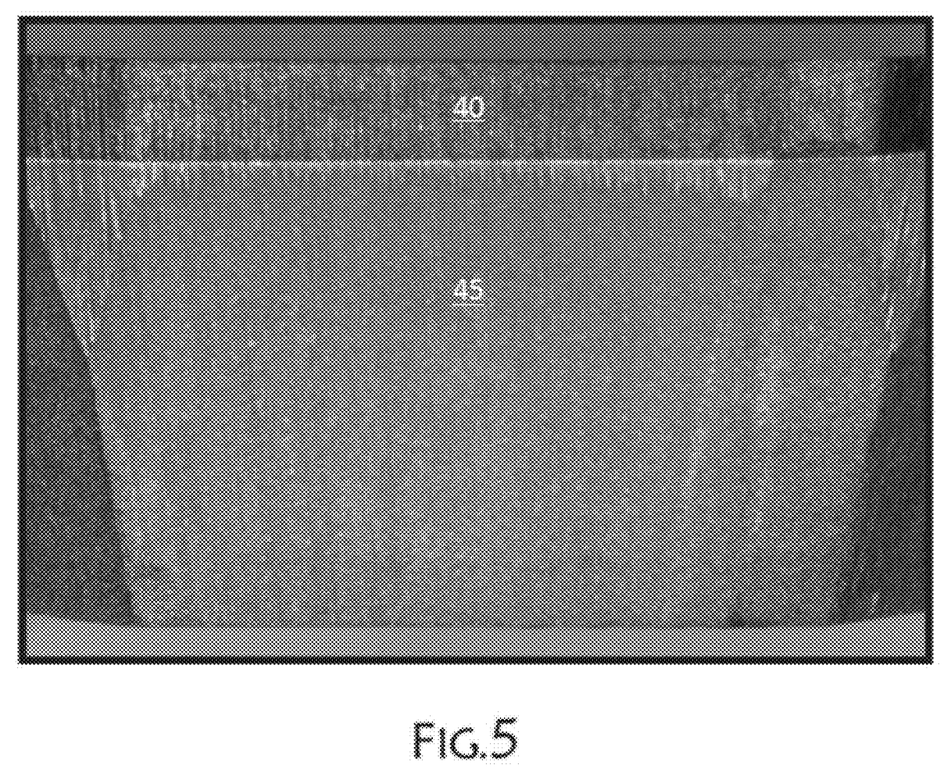
FIG. 5 is a side view of a cutting insert formed via laser administration of a cutting tool pattern to a blank, the blank comprising a layer of PCD coupled to a cemented carbide substrate according to some embodiments.

In addition to edge radius, ultrahard material of the flank face of the as-formed cutting edge can have surface roughness ($R_a$) less than 0.4 µm. In some embodiments, surface roughness of the ultrahard material along the flank face is 0.1-0.3 µm. Flank surface roughness of the ultrahard material is formed during administration of the cutting tool pattern to the blank. As described herein, the layer of ultrahard material forming the cutting edge can be coupled to a substrate, such as cemented carbide or ceramic. When a substrate is present, substrate surfaces of the cutting tool flank can have surface roughness ($R_a$) of 0.25 µm to 0.5 µm. Additionally, flank substrate surfaces can have vertical striations. FIG. 4 is a side view of a cutting insert formed via administration of a cutting tool pattern to a blank, the blank comprising a layer of PCD 40 coupled to a cemented carbide substrate 45. As illustrated in FIG. 4, vertical striations are present in flank surfaces of the substrate 45, including along primary and secondary flank clearances. The vertical striations can exhibit periodic spacing or aperiodic spacing. In some embodiments, the vertical striations effectuate waviness to flank substrate surfaces. FIG. 5 is a side view of another cutting insert formed via administration of a cutting tool pattern to a blank, the blank comprising a layer of PCD 40 coupled to a cemented carbide substrate 45. As illustrated in FIG. 5, the vertical striations along the flank surface are much finer, indicating a smoother surface finish. Vertical striations and associated waviness can be at least partially controlled by laser processing parameters, including properties of the laser beam and/or cutting speeds. For example, flank substrate surfaces can have waviness ($W_a$) of 0.05 µm to 0.2 µm. As described herein, roughness, waviness and/or vertical striations in flank substrate surfaces are produced by administration of the cutting tool pattern to the blank via a single processing step with the laser machining apparatus. Accordingly, these flank surface features are not a result of processing prior or subsequent to administration of the cutting tool pattern to the blank in a single step.

In some embodiments, a flank surface roughness gradient exists between the ultrahard material and substrate. In other embodiments, flank surface roughness of the ultrahard material is substantially matched to substrate roughness.

As the cutting tool pattern is administered in a single processing step, incidence angle of the laser beam can vary to impart structural elements and/or features of the pattern to the blank. In some embodiments, for example, angle of incidence may vary as a function of cutting depth to provide primary flank clearance and/or secondary flank clearance. Moreover, laser beam parameters may vary over the cutting tool pattern. In some embodiments, laser beam diameter varies as a function of cutting depth. Laser beam diameter can increase with cutting depth or increase when a depth threshold is met. For example, laser beam diameter increases when machining a secondary flank clearance. Laser beam parameters can also vary according to the material being machined. For example, laser beam parameters for the ultrahard material, such as PCD or PCBN, can vary relative to laser beam parameters for the cemented carbide or ceramic substrate.

In some embodiments, laser beam diameter varies 30-80 percent over the cutting tool pattern. Variation in laser beam parameters can speed administration of cutting tool pattern, thereby realizing time efficiencies. In some embodiments, the cutting tool pattern can be administered in a time period of 10-120 minutes or a time period of 15-30 minutes. As described herein, completion of the cutting pattern can provide a cutting tool in final form, with no additional processing needed.

In another aspect, articles formed according to methods described herein are provided.

II. Cutting Tools

In a further aspect, cutting inserts comprising ultrahard materials are described herein. A cutting insert, for example, comprises a layer of ultrahard material defining a rake face and flank face of at least one cutting edge, the cutting edge having a radius less than 10 µm, wherein surface roughness ($R_a$) of the ultrahard material along the flank face is less than 0.4 µm. The cutting inserts can have any composition, design, geometry and/or properties described in Section I herein. Ultrahard material of the cutting inserts, for example, may be PCD, PCBN or CVD diamond. Moreover, the cutting inserts can have any edge radius, surface roughness and/or surface waviness described in Section I above.

These and other embodiments are further illustrated in the following non-limiting examples.

Example 1: Method of Cutting Insert Fabrication

The electronic cutting insert pattern of FIG. 1 was loaded onto a Synova LCS 50 laser machining apparatus. Several dimensions of the cutting insert to be fabricated from the pattern are provided in Table VI. The electronic cutting insert pattern comprised a roughing sub-pattern and finishing sub-pattern having an offset of 0.25 µm.

TABLE VI

| Cutting Insert Parameters | | | | | | |
|---|---|---|---|---|---|---|
| Length (mm) | Width (mm) | Nose Radius (mm) | Wiper Angle (Deg.) | Wiper Width (mm) | Primary Clearance (Deg.) | Secondary Clearance (Deg.) |
| 26.51-26.77 | 9.52-9.54 | 0.74-0.84 | 89.66-89.75 | 1.39-1.65 | 9.5-10.5 | 14.5-15.5 |

A blank comprising a layer of PCD on cemented tungsten carbide (WC—Co) was provided. The PCD layer had thickness of 0.7 mm and the WC—Co substrate had thickness of about 4 mm. The blank was loaded into the laser machining apparatus and the pattern was administered with the laser. The laser beam of the Synova LCS 50 apparatus was confined by a stream or jet of water. The cutting insert pattern was administered in a single processing step within the perimeter of the blank as illustrated in FIGS. 2 and 3. Total cutting time of the single processing step was 11 minutes and 19 seconds. The resulting cutting insert fell within the tolerances of Table VI. Moreover, the cutting edge radius was 1.3 µm with surface roughness of the flank PCD being 0.34 µm. Flank surface roughness of the WC—Co was about 0.5 µm. The flank surfaces also exhibited vertical striations and waviness similar to that illustrated in FIGS. 4 and 5. Nineteen (19) additional cutting inserts were fabricated from individual blanks according to the same parameters. The average cutting edge radius of the 19 cutting inserts was 1.9 µm.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of making a cutting tool comprising:
   electronically loading a cutting tool pattern into a laser machining system;

providing a blank to the laser machining system, the blank comprising a layer of ultrahard material;

administering the cutting tool pattern including a primary flank clearance to the blank via a single laser processing step to form the cutting tool including at least one as-formed cutting edge comprising the ultrahard material and having an edge radius less than 10 μm.

2. The method of claim 1, wherein the edge radius is from 1-5 μm.

3. The method of claim 1, wherein the ultrahard material of a flank face of the as-formed cutting edge has surface roughness ($R_a$) less than 0.4 μm.

4. The method of claim 3, wherein the surface roughness is 0.1-0.3 μm.

5. The method of claim 1, wherein the cutting tool pattern further comprises a secondary flank clearance.

6. The method of claim 5, wherein the secondary flank clearance intersects the primary flank clearance.

7. The method of claim 1, wherein the layer of ultrahard material is coupled to a substrate.

8. The method of claim 7, wherein the substrate comprises ceramic, cermet, cemented carbide or combinations thereof.

9. The method of claim 7, wherein a flank surface of the substrate has surface roughness ($R_a$) of 0.25 μm to 0.5 μm.

10. The method of claim 7, wherein a flank surface the substrate comprises vertical striations.

11. The method of claim 10, wherein the flank surface has waviness ($W_a$) of 0.05 μm to 0.2 μm.

12. The method of claim 7, wherein a surface roughness gradient exists between the ultrahard material and the substrate.

13. The method of claim 1, wherein the cutting tool pattern consists of a roughing sub-pattern.

14. The method of claim 1, wherein the cutting tool pattern comprises a roughing sub-pattern and a finishing sub-pattern.

15. The method of claim 1, wherein the single laser processing step employs a laser beam having diameter less than 100 μm.

16. The method of claim 15, wherein the laser beam diameter is 30-70 μm.

17. The method of claim 15, wherein the laser beam is confined by a medium supporting total internal reflection of the laser beam.

18. The method of claim 1, wherein the single laser processing step comprises altering laser beam diameter as function of cutting depth in the blank.

19. The method of claim 18, wherein the laser beam diameter increases in a region of the blank wherein a secondary clearance of the cutting tool is formed.

20. The method of claim 1, wherein the ultrahard material has a cubic crystalline structure.

21. The method of claim 20, wherein the ultrahard material comprises diamond or cubic boron nitride.

22. The method of claim 1, wherein the single laser processing step is initiated within the blank perimeter.

23. The method of claim 1, wherein the single laser processing step places to cutting tool in final form.

24. The method of claim 23, wherein the single laser processing step is administered for a time period of 10-120 minutes.

25. The method of claim 1, wherein the cutting tool is a cutting insert.

26. The method of claim 1, wherein the blank is not sectioned from a mother blank.

* * * * *